(12) United States Patent
Böttcher

(10) Patent No.: US 11,435,527 B2
(45) Date of Patent: Sep. 6, 2022

(54) OPTICAL FIBER CLEAVING DEVICE, A METHOD FOR CLEAVING AN OPTICAL FIBER AND USE OF AN OPTICAL FIBER CLEAVING DEVICE

(71) Applicant: NYFORS TEKNOLOGI AB, Stockholm (SE)

(72) Inventor: Uwe Böttcher, Stockholm (SE)

(73) Assignee: Nyfors Teknologi AB, Stockholm (SE)

( * ) Notice: Subject to any disclaimer, the term of this patent is extended or adjusted under 35 U.S.C. 154(b) by 299 days.

(21) Appl. No.: 16/495,673

(22) PCT Filed: Mar. 20, 2018

(86) PCT No.: PCT/SE2018/050272
§ 371 (c)(1),
(2) Date: Sep. 19, 2019

(87) PCT Pub. No.: WO2018/174789
PCT Pub. Date: Sep. 27, 2018

(65) Prior Publication Data
US 2020/0033534 A1    Jan. 30, 2020

(30) Foreign Application Priority Data

Mar. 20, 2017 (SE) .................................. 1750328-5

(51) Int. Cl.
*G02B 6/25* (2006.01)
(52) U.S. Cl.
CPC ...................................... *G02B 6/25* (2013.01)
(58) Field of Classification Search
CPC ...... G02B 6/25; G02B 6/3616; G02B 6/3624;
B23Q 3/06; B23Q 3/062; B23Q 3/064;
B23Q 3/065; B23Q 3/08; B23Q 3/084;
B23Q 3/086; Y10T 225/357;
(Continued)

(56) References Cited

U.S. PATENT DOCUMENTS

| 6,711,322 | B1* | 3/2004 | Kohda ................. | G02B 6/3504 385/22 |
| 2002/0131729 | A1* | 9/2002 | Higgins, III ......... | G02B 6/4225 385/91 |

(Continued)

FOREIGN PATENT DOCUMENTS

| DE | 89 04 579 U1 | 6/1989 |
| EP | 2 902 823 A1 | 8/2015 |
| GB | 2162838 A | 2/1986 |

(Continued)

*Primary Examiner* — Evan H MacFarlane
(74) *Attorney, Agent, or Firm* — Dilworth & Barrese, LLP

(57) ABSTRACT

An optical fiber cleaving device (1) has a knife (3) and two clamping arrangements (6a, 7). A first clamping arrangement (6a) includes an element (8a) configured to receive a light-radiation-curing adhesive (11) together with an end portion (5a) of the fiber (5), which is embedded in the adhesive (11). A lamp (15) is configured to apply light on the adhesive (11) to cure it so that the end portion (5a) of the fiber (5) is firmly bound to the element (8a). The end portion (5a) is in this way fixedly held during cleaving of the fiber (5). A method is also provided for cleaving an optical fiber (5), in which the fiber (5) to be cleaved is clamped using light-radiation-curing adhesive (11), as well as use of a fiber cleaving device (1).

10 Claims, 4 Drawing Sheets

(58) Field of Classification Search
CPC ............... Y10T 225/321; Y10T 29/514; Y10T 29/5187; Y10T 29/5193; Y10T 29/49998
USPC .......................... 269/7, 56, 57; 385/136, 137
See application file for complete search history.

(56) References Cited

U.S. PATENT DOCUMENTS

2011/0052135 A1   3/2011  Wiley et al.
2015/0323746 A1  11/2015  Qingyun

FOREIGN PATENT DOCUMENTS

JP         3192771 B2    3/1994
JP       2003315631 A  * 11/2003
WO     2017/205865 A1   11/2017

\* cited by examiner

OPTICAL FIBER CLEAVING DEVICE, A METHOD FOR CLEAVING AN OPTICAL FIBER AND USE OF AN OPTICAL FIBER CLEAVING DEVICE

TECHNICAL FIELD OF THE INVENTION

The present invention relates to an optical fiber cleaving device comprising cleaving means configured to cleave an optical fiber, and first and second clamping arrangements configured to fixedly hold a fiber to be cleaved at opposite sides of a point of the fiber to be hit by the cleaving means for cleaving the fiber.

The invention relates to such an optical fiber cleaving device of any conceivable type, which can be used for mass-production purposes in the fiber-optic communication industry or in more specialized fields such as in manufacturing of sensors or fiber-lasers or even for small scale manufacturing in workshops or laboratories, as a few examples. Such a fiber cleaving device may for instance be a device which is stationary arranged in a production line, a mobile device to be moved between different working stations or a small handheld device.

An optical fiber is a thin rod made of a glass-, plastic- or similar material and is most commonly used as a waveguide to transmit light between the two ends of the rod.

The ends of optical fibers are commonly prepared for a variety of purposes, such as jointing, mounting of a fiber in a component, characterization etc., by a process known as cleaving. In such a process, the fiber to be cleaved is usually clamped by first and second clamping arrangements on opposite sides of a cleaving means for cleaving the fiber. One of the clamping arrangements is then moved away from the other for tensioning the fiber clamped therebetween and the movable clamping arrangement is then secured so that the fiber is fixedly held between the clamping arrangements. The cleaving means usually has a knife blade of a hard material, such as diamond, which is brought into a lateral engagement with the tensioned fiber in such a manner as to initiate a fracture which subsequently propagates through the fiber cross-section until the fiber parts.

The resulting cleaved fiber end surface should, as far as possible, be optically flat and perpendicular or angled to the fiber longitudinal axis. To obtain such fiber ends it is among other things important that the fiber to be cleaved is clamped and held by the clamping arrangements in a suitable manner.

BACKGROUND ART

An optical fiber cleaving device of the type described in the introduction is already known through the document EP 2 902 823 A1.

The device described in said document comprises first (5) and second (6) fiber clamping arrangements configured to clamp and fixedly hold a fiber (4) to be cleaved at opposite sides of a point of the fiber to be hit by cleaving means (3) for cleaving the fiber (see FIG. 1). Each of the clamping arrangements comprises a first member fixedly secured with respect to a frame (2) of the device, and a second member hingedly connected to the first member and movably arranged thereto, between a closed clamping position in which a portion of the fiber is clamped between clamping surfaces of the members, and an open position allowing the fiber to be inserted in or removed from the clamping arrangement.

The process of cleaving a fiber using such a cleaving device comprises: firstly, placing a portion of the fiber in the first clamping arrangement (5) and transfer this arrangement to the closed clamping position; secondly, placing another portion of the fiber in the second clamping arrangement (6) and transfer this arrangement to the closed clamping position; thirdly, tensioning the fiber by moving one of the clamping arrangements away from the other; and fourthly, cleaving the fiber with the cleaving means (3).

One complication by the use of fiber cleaving devices with clamping arrangements of this type, i.e. which clamp the fiber between two clamping surfaces, is that the closing of the second clamping arrangement causes a slight twist of the fiber portion received therein and thereby inadvertent torsional stress in the fiber to be cleaved. This torsional stress impairs the result of the cleaving as it for instance may cause the fracture initiated by the cleaving blade to not propagate in a desired straight line through the fiber which may give the resulting fiber end surface unsatisfying characteristics. There has long been an aim to reduce this problem within this technical field, but has proven to be extremely complicated to build a clamping arrangement configured to clamp a fiber between two clamping surfaces without twisting the fiber, as a rotation of the fiber portion clamped of as small as 0,1° may be enough to substantially impair the result of the cleaved fiber end surface.

SUMMARY OF THE INVENTION

The object of the present invention is to provide an optical fiber cleaving device of the type defined in the introduction being improved in at least some aspect with respect to such cleaving devices already known, for example through said document.

This object is according to the invention obtained by providing such an optical fiber cleaving device which is further characterized in that the first clamping arrangement comprises an element configured to receive a first portion of the fiber to be cleaved together with a light-radiation-curing adhesive, and that the device further comprises means configured to apply light on said adhesive to cure it to firmly bind the first fiber portion to said element so as to keep this first portion at a fixed distance to said point during cleaving of the fiber by the cleaving means.

A fiber cleaving device with these features enables clamping of a fiber by the first and second clamping arrangements without twisting the fiber, which means that no torsional stress is present in the fiber during cleaving and thereby that a very good result of the resulting fiber end surface may be achieved. The clamping without twisting the fiber is made possible by the fact that the first clamping arrangement is configured to clamp the first fiber portion by means of light-radiation-curing adhesive. More specifically, this is achieved by firstly clamping a second portion of the fiber in the second clamping arrangement and thereafter clamping a first portion of the fiber in the first clamping arrangement, by placing the first fiber portion in light-radiation-curing adhesive received on said element so that the fiber may straighten out to release any torsional stress therein, whereafter light is applied on the adhesive by said means so that the adhesive is cured and the first fiber portion firmly bound to the element, without torsion in the fiber. An optical fiber cleaving device provided with such a first clamping arrangement as well as such light applying means may accordingly produce an end surface of a fiber by cleaving which has substantially improved characteristics compared to end surfaces of fibers cleaved using fiber cleaving devices already known.

According to an embodiment of the invention the device further comprises means configured to apply the light-radiation-curing adhesive to a receptacle or receiving element and including a container for storing the adhesive and a nozzle for dispensing adhesive from the container onto said element.

According to an embodiment of the invention at least parts of the cleaving means and the first and second clamping arrangements are mounted on a frame structure of the cleaving device, and the receiving element is configured to be removably arranged at the frame structure in such a way that it is fixedly secured thereto during cleaving of a fiber and removable therefrom for enabling removal of the first fiber portion after cleaving. Such a receiving element enables easy removal of the first fiber portion from the device after cleaving of the fiber.

According to an embodiment of the invention the receiving element is provided with at least one elongated recess and is configured to receive said first fiber portion together with the adhesive in said recess. Such a recess enables easy positioning and steady fixation of the first fiber portion on the receiving element.

According to an embodiment of the invention the receiving element is provided with a plurality of said recesses in the form of elongated grooves disposed at a surface of the element, and the element is configured to, when arranged at the frame structure, be operable between a first mode in which said surface is firmly fixed with respect to the frame structure so that a first said groove, in which the first portion of a fiber is received and firmly bound by adhesive, is held in a fixed position during cleaving of this fiber, and a second mode in which said surface is movable with respect to the frame structure so as to allow said first groove to be moved away from said position after cleaving of said fiber and an empty second groove to be fed to said position in order to receive a first portion of another fiber to be cleaved. Such a receiving element enables successive cleaving of a plurality of fibers using the same element for fixedly holding these during cleaving, which means that a plurality of fibers may be cleaved with little need for actuation of the first clamping arrangement by an operator.

According to an embodiment of the invention the receiving element is configured to be rotatably arranged at the frame structure in such a way that said surface provided with grooves is movable with respect to the frame structure in the second mode of the element by rotation of the element about an axis of rotation.

According to an embodiment of the invention said surface is an outer peripheral surface of the element which has substantially the shape of a circular cylinder, the element is arranged to have its axis of rotation extending at least substantially in parallel with the extension of a fiber to be cleaved during cleaving, and the grooves disposed at said surface each extend at least substantially in parallel with said axis of rotation, from a first end portion of the element located closest to the cleaving means and along at least a part of the element towards a second opposite end portion thereof, and have open ends at said first end portion of the element facing away from said second end portion.

According to an embodiment of the invention said surface is a substantially flat surface extending in a plane at least substantially in parallel with the extension of a fiber to be cleaved during cleaving, the axis of rotation of the element extends through a center portion of said surface in a direction at least substantially perpendicular to said plane, and the grooves disposed at said surface each extend from an outer peripheral edge thereof towards said center portion and have open ends at said edge facing away from the center portion.

According to an embodiment of the invention the light-radiation-curing adhesive is a UV-curable adhesive, and said light applying means are configured to emit ultraviolet (UV) radiation onto the adhesive. A UV-curable adhesive is very suitable to use for clamping an optical fiber to be cleaved in a cleaving device, for instance due to the short curing time thereof enabling fast operation of the cleaving device.

According to another embodiment of the invention said at least one elongated recess is an elongated groove arranged at a surface of the receiving element.

According to another embodiment of the invention said element is configured to receive a first portion of the fiber to be cleaved in the form of an end portion of this fiber.

According to another embodiment of the invention said second clamping arrangement has two members provided with clamping surfaces, at least the parts of said members provided with clamping surfaces being movable with respect to each other between a closed clamping position enabling securing of a second portion of a fiber to be cleaved therebetween for fixedly holding this second portion during cleaving of the fiber, and an open position allowing the fiber to be inserted in or removed from the second clamping arrangement.

According to another embodiment of the invention said surface of the element is provided with at least 10, at least 20, at least 50, preferably between 10 and 200, more preferred between 50 and 150 said grooves.

According to another embodiment of the invention the element is configured to be discarded after one or a plurality of uses in the form of holding a fiber portion during cleaving of a fiber.

The invention also relates to a method for cleaving an optical fiber according to the description herein. Realizations of, and advantages with, such a method clearly appears from the above and following description of embodiments of an optical fiber cleaving device according to the invention.

According to an embodiment of the invention the method further comprises a step of:

b') tensioning the fiber between said positions by moving at least one of the clamped fiber portions away from the other.

The invention also relates to use of an optical fiber cleaving device according to the description herein.

Further advantages as well as advantageous features of the invention will appear from the following description of embodiments of the invention.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
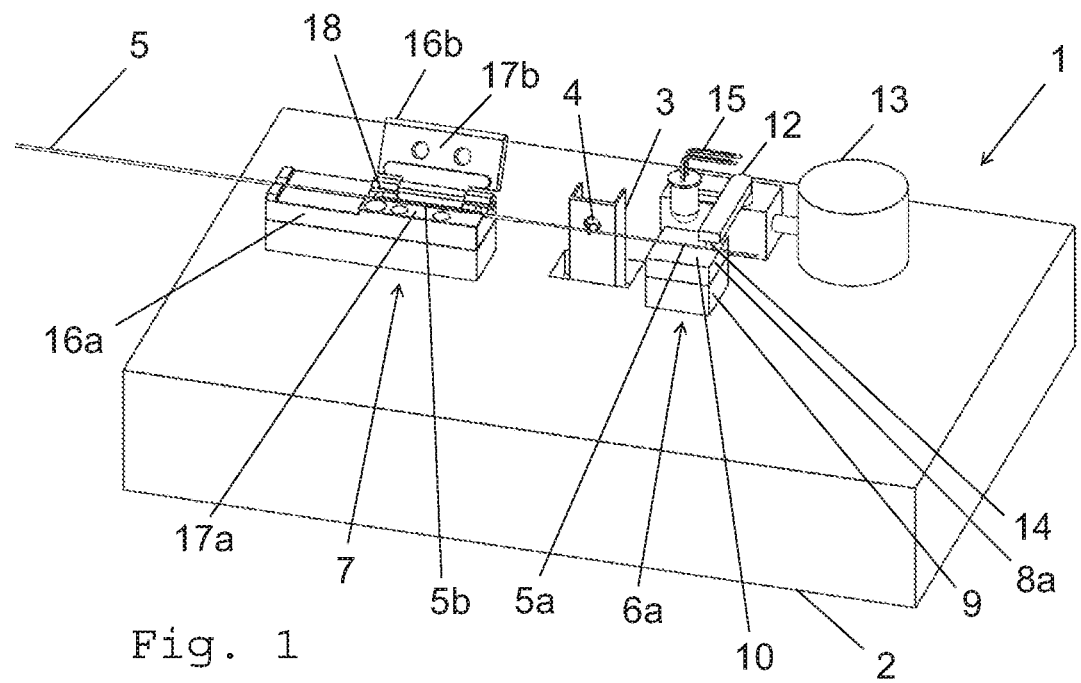
FIG. 1 is a simplified perspective view from above of an optical fiber cleaving device according to a first embodiment of the invention, in which a fiber to be cleaved is inserted in the first and second clamping arrangements.
Figure 2:
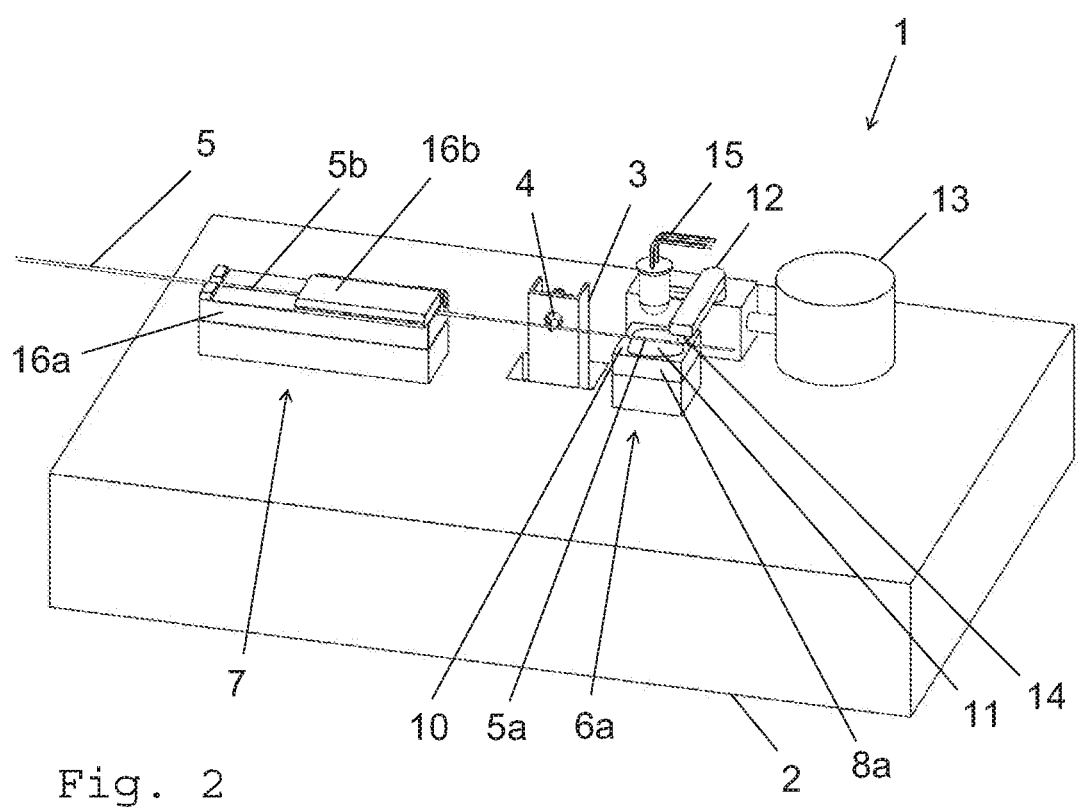
FIG. 2 is a view corresponding to FIG. 1, in which a fiber to be cleaved is fixedly held by the first and second clamping arrangements.
Figure 3:
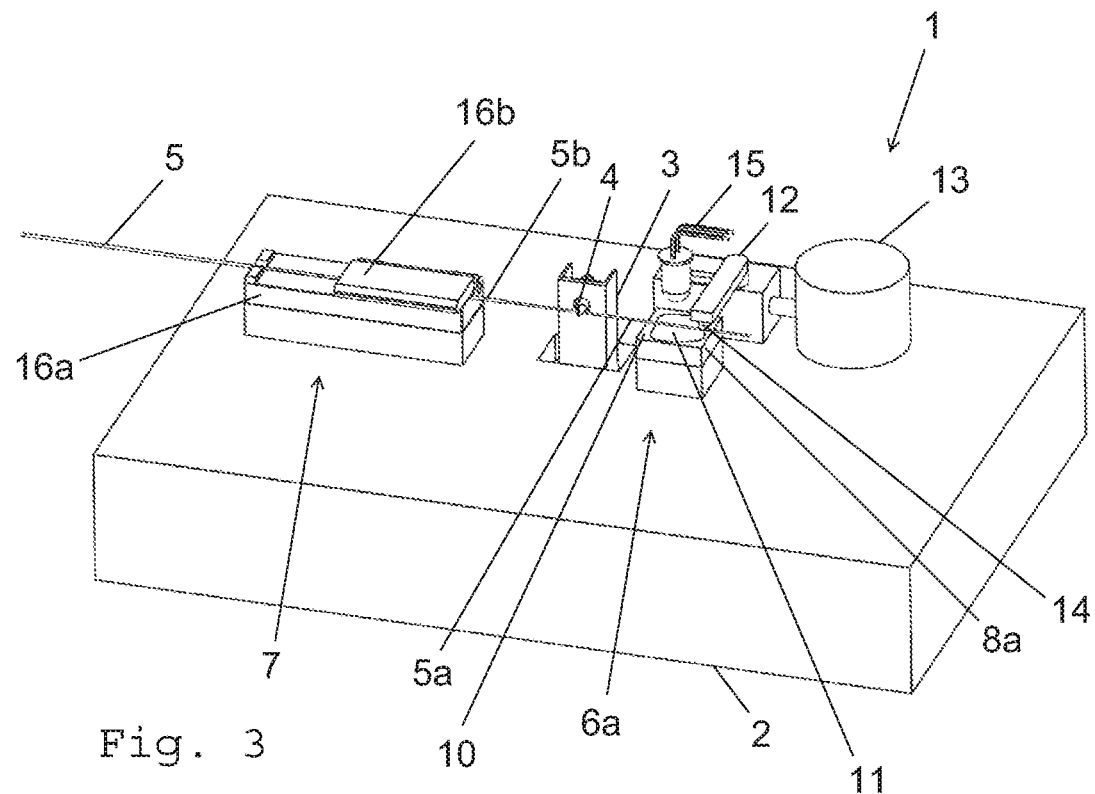
FIG. 3 is a view corresponding to FIG. 1, in which a fiber has been cleaved by the cleaving means.
Figure 4:
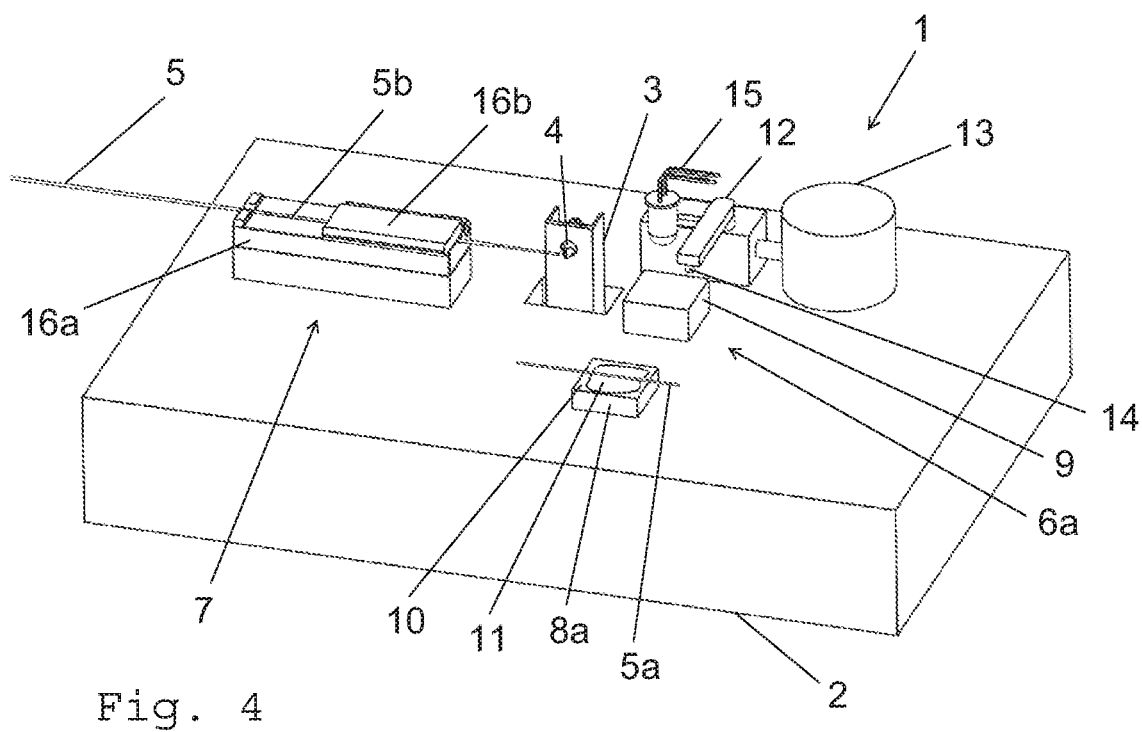
FIG. 4 is a view corresponding to FIG. 1, in which a fiber has been cleaved by the cleaving means and the receiving element with the first fiber portion is removed from the device in order to be discarded.
Figure 5:
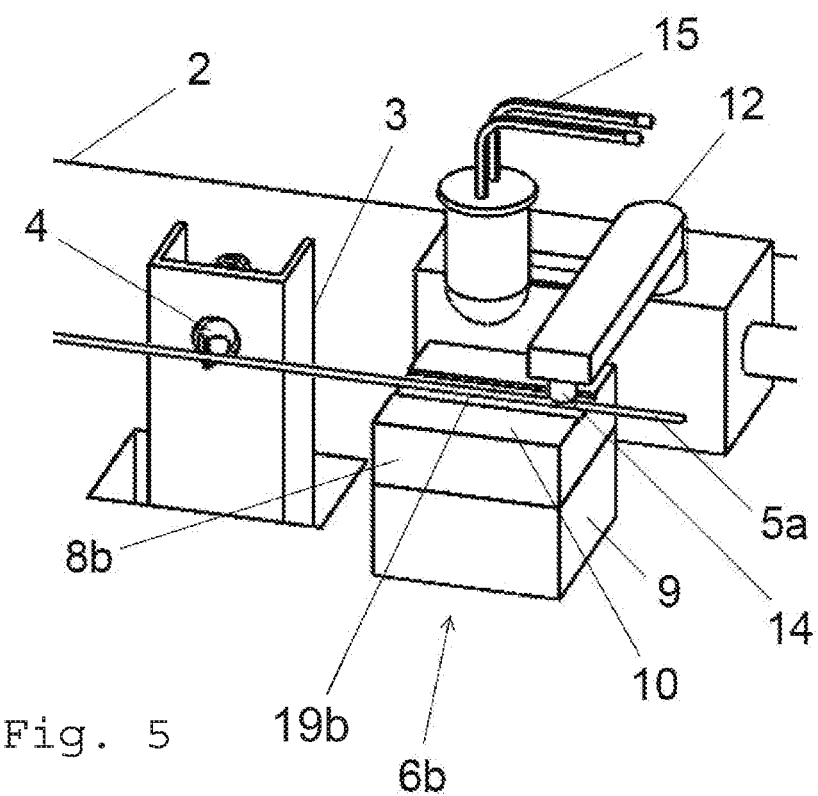
FIG. 5 is a simplified perspective view of the first clamping arrangement of a device according to a second embodiment of the invention.
Figure 6:
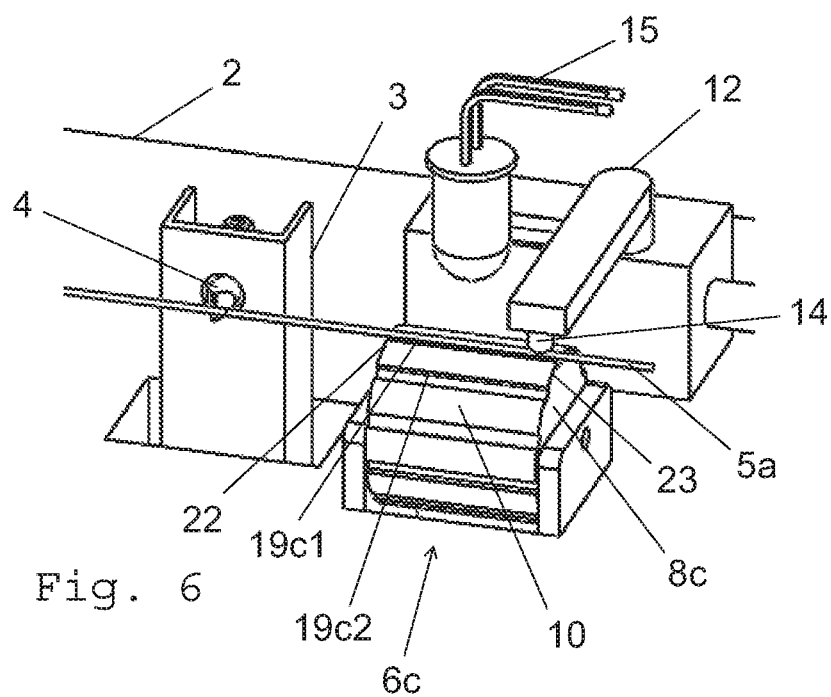
FIG. 6 is a simplified perspective view of the first clamping arrangement of a device according to a third embodiment of the invention.
Figure 7:
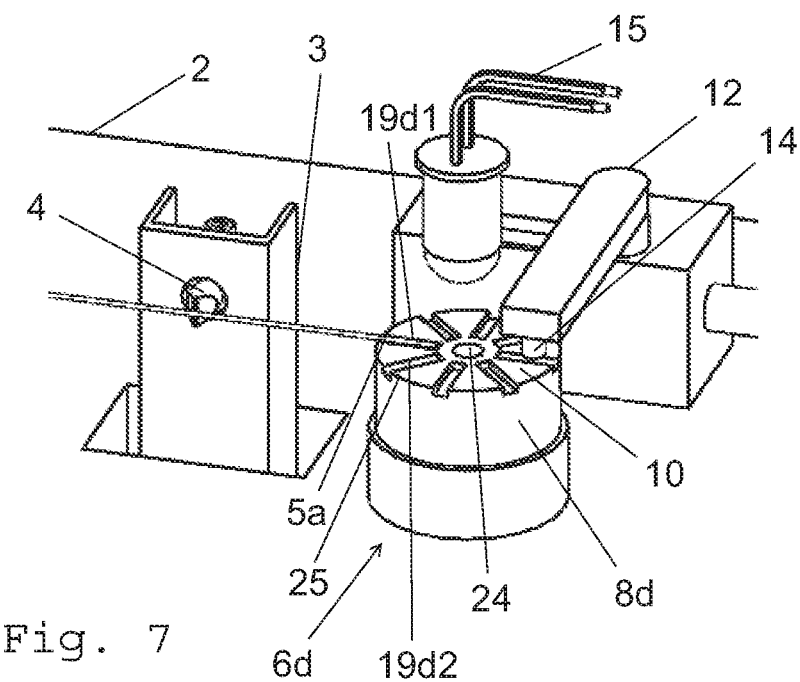
FIG. 7 is a simplified perspective view of the first clamping arrangement of a device according to a fourth embodiment of the invention.

An optical fiber cleaving device according to a first embodiment of the invention is illustrated in the appended FIGS. 1-4 and a first clamping arrangement of such a device according to a second, third and fourth embodiment of the invention is illustrated in the appended FIGS. 5-7 respectively. A device according to these embodiments of the invention will now be described while at the same time making reference to all these figures. The parts of the fiber cleaving device according to the second, third and fourth embodiment of the invention which are not described to be different in the description below are configured in the same way and provide the same function as the corresponding parts of the fiber cleaving device according to the first embodiment of the invention.

The optical fiber cleaving device 1 according to a first embodiment of the invention (shown in FIGS. 1-4) comprises a frame structure 2 provided with cleaving means 3 with a diamond blade 4 configured to cleave an optical fiber 5, and first 6a and second 7 clamping arrangements configured to fixedly hold a fiber to be cleaved at opposite sides of a point of the fiber to be hit by the blade 4 of the cleaving means 3 for cleaving the fiber. The cleaving means however, need not necessarily include a blade, but could be any type of means suitable for cleaving a fiber, such as means configured to cleave the fiber by a laser beam.

The first clamping arrangement 6a comprises an element 8a in the form of a small plate, for instance made of plastic, which is removably arranged on a support member 9 of the frame structure 2. The element is configured to receive a first portion 5a, usually in the form of an end portion, of a fiber 5 to be cleaved on a surface 10 of the element (see FIG. 1). The element is further configured to receive at least one drop of light-radiation-curing adhesive in the form of UV-curing adhesive 11 on said surface 10, so that at least a part of the first fiber portion 5a is embedded therein (see FIG. 2). The adhesive is applied by means in the form of a dispenser 12 mounted on the frame structure 2 and including a container 13 for storing the adhesive 11 and a nozzle 14 for dispensing adhesive from the container onto said element.

It is preferred that the adhesive is applied to the surface of the element 8a before the first fiber portion so that the latter may easily be placed in a proper position in the adhesive. This is because it is desirable to have the first fiber portion 5a received in the adhesive 11 on the surface 10 of the element in such a way that the fiber along at least a part of this first portion is completely embedded in adhesive while at the same time the fiber should not be in contact with the surface 10 of the element, but be held at a distance thereto by the adhesive. It is however also possible to firstly place the first fiber portion on the surface of the element and then apply the adhesive thereon.

The device 1 further comprises means in the form of a UV-lamp 15 configured to emit light in the form of ultraviolet (UV) radiation onto the adhesive 11 received together with the first fiber portion 5a on the element 8a to cure the adhesive so that this firmly binds the first fiber portion to said element. The receiving element 8a is configured to be removably arranged on the support member 9 so as to be fixedly secured thereto during cleaving of the fiber 5 whereby the first fiber portion 5a firmly bound to the element by the adhesive will be fixedly held by the first clamping arrangement 6a during the cleaving.

The means for applying adhesive and light, here shown as a stationary mounted dispenser 12 and a "floating" UV-lamp 15, respectively, may each independently be either stationary mounted on the frame structure 2 of the device 1 or mobile devices to be held and operated by an operator. Furthermore, a light-radiation-curable adhesive which is intended to be cured by a different type of light than ultraviolet radiation as well as means configured to emit a different type of light than ultraviolet radiation may be used by a device according to the invention, such as an adhesive curable by blue light and a lamp configured to emit blue light, respectively.

The second clamping arrangement 7 is formed as a conventional fiber clamp and has two members 16a, 16b provided with clamping surfaces 17a, 17b. The members are configured to be movable with respect to each other by means of a hinge connection 18, between a closed clamping position (see FIG. 2) enabling securing of a second portion 5b of a fiber 5 to be cleaved between the clamping surfaces 17a, 17b, and an open position (see FIG. 1) allowing the fiber to be inserted in or removed from the second clamping arrangement 7.

Accordingly, the first 6a and second 7 clamping arrangements of the device 1 are configured to fixedly hold a fiber 5 to be cleaved, at opposite sides of and at a fixed distance to a point of the fiber to be hit by the blade 4 of the cleaving means 3 for cleaving the fiber, by firmly clamping a first 5a and second 5b portion of the fiber, respectively.

Furthermore, the receiving element 8a is configured to be removed from the support member 9 after cleaving of a fiber 5 and to be discarded together with the first fiber portion 5a and the adhesive 11 received thereon. The first clamping arrangement 6a is then provided with a corresponding unused element 8a to receive a first portion of another fiber to be cleaved. The receiving element may be removably arranged at the frame structure 2, here on a support member 9 thereof, by means of any suitable securing means, such as bolts, magnets, pins received in holes etc.

The first clamping arrangement 6b of an optical fiber cleaving device according to a second embodiment of the invention is shown in FIG. 5. In this embodiment, the receiving element 8b is provided with an elongated recess in the form of an elongated groove 19b disposed at and extending along the entire surface 10 of the element, and the element is configured to receive a first fiber portion 5a together with the adhesive 11 in said groove. Such a groove simplifies the positioning of the first fiber portion on the element 8b and implies a uniform distribution of adhesive around said fiber portion so that this may be firmly bound to the element without being subjected to unevenly distributed radial forces when the adhesive is cured.

The first clamping arrangement 6c, 6d of an optical fiber cleaving device according to a third and fourth embodiment of the invention is shown in FIGS. 6 and 7, respectively. The receiving elements 8c, 8d are according to these embodiments provided with a plurality of recesses in the form of elongated grooves 19*c*1-2, 19*d*1-2 disposed at a surface 10 of the respective element. Each element 8*c*, 8*d* is configured to, when arranged at the frame structure 2, be operable between a first mode in which said surface 10 is firmly fixed with respect to the frame structure so that a first said groove 19*c*1, 19*d*1, in which the first portion 5*a* of a fiber 5 is received and firmly bound by adhesive 11, is held in a fixed position during cleaving of this fiber, and a second mode in which said surface 10 is movable with respect to the frame structure 2, or to at least a part thereof, so as to allow said first groove 19*c*1, 19*d*1 to be moved away from said position after cleaving of said fiber and an empty second groove 19*c*2, 19*d*2 to be fed to said position in order to receive a first portion of another fiber to be cleaved.

As shown in FIGS. 6 and 7, sidewalls of grooves 19*c*, 19*d* extend between opposite ends thereof.

This operation of the surface provided with grooves 19*c*1-2, 19*d*1-2 may be performed by the fact that the respective receiving element is rotatably arranged at the frame structure 2 in such a way that it may be actuated in the second mode to rotate about an axis of rotation so as to feed an empty groove 19*c*2, 19*d*2 to said position, and in the first mode to stand still so as to keep a first groove 19*c*1, 19*d*1 in said position and thereby fixedly hold a first fiber portion 5*a* firmly bound by adhesive 11 therein. However, the surface 10 of a receiving element could also be movable with respect to the frame structure 2 by displacing the receiving element thereon in said second mode.

The receiving element 8*c* of the first fiber clamping arrangement 6*c* shown in FIG. 6 has the shape of a circular cylinder and is arranged to have its axis of rotation extending at least substantially in parallel with the extension of a fiber 5 to be cleaved during cleaving, i.e. towards the second clamping arrangement 7. The surface 10 provided with grooves 19*c*1-2 is an outer peripheral surface of the element and the grooves each extend at least substantially in parallel with said axis of rotation, from a first end portion 22 of the element 8*c* located closest to the cleaving means 3 and along the entire length of the element to a second opposite end portion 23 thereof. The grooves 19*c*1-2 have open ends at said first and second end portion of the element so as to allow easy insertion of a first fiber portion 5*a* in a groove at the first end portion, and this first fiber portion to protrude out of the groove at the second end portion and away from the element, respectively.

The grooves could however also be disposed at the surface 10 to extend along at least a part, preferably almost half, of the length of the element 8*c*. In such a case, the surface of the element may be provided with such grooves extending from both end portions 22, 23 thereof towards the other, so that the element may be turned and arranged to have the second end portion 23 closest to the cleaving means 3 to receive first fiber portions 5*a* in the grooves provided on this second end portion when all the grooves on the first end portion has been used.

The receiving element 8*d* of the first fiber clamping arrangement 6*d* shown in FIG. 7 has the shape of a circular cylinder or disc and the surface 10 provided with grooves 19*d*1-2 is a substantially flat top surface of the element which extends in a plane at least substantially in parallel with the extension of a fiber 5 to be cleaved during cleaving. The element 8*d* is arranged to have its axis of rotation extending through a center portion 24 of said surface 10 in a direction at least substantially perpendicular to said plane. The grooves 19*d*1-2 disposed at said surface each extend from an outer peripheral edge 25 thereof towards the center portion 24 and have open ends at said edge facing away from the center portion allowing easy insertion of respective first fiber portions 5*a* therein.

The number of grooves disposed on the surfaces 10 of the rotatably arranged receiving elements 8*c*, 8*d* depends on the intended use of the device, i.e. on the diameters of the fibers to be cleaved etc. This number could be somewhere between 5 or 10 and several hundreds, but are preferably between 50 and 150. Also, the grooves may have a different shape than shown in the figures, such as have a cross-section in the shape of a U or a V, or be provided on the surfaces as a wave-like pattern.

A method for cleaving an optical fiber 5 according to an embodiment of the invention is now to be described. This description of the method also serves to further describe the use of a fiber cleaving device 1 according to the invention. Reference will now be made to FIGS. 1-4, although any of the first fiber clamping arrangements 6*b-d* shown in FIGS. 5-7 may as well be used in a method according to the invention.

At first, the fiber to be cleaved is usually stripped, i.e. an outer coating is removed, using a stripping-device and thereafter cleaned with alcohol. The second portion 5*b* of the fiber 5 is then placed in (see FIG. 1) and firmly clamped (see FIG. 2) by the second clamping arrangement 7 in a way that has been described above. The first fiber portion 5*a* is thereafter firmly clamped by the first clamping arrangement 6*a* (see FIG. 2) by applying UV-curable adhesive 11 onto said surface 10 of the element, placing the first fiber portion in the adhesive in such a way that the fiber is held at a distance to the surface by the adhesive and at least a part of the first fiber portion 5*a* is completely embedded therein, and emitting UV-radiation onto the adhesive 11 to cure it to firmly bind the first fiber portion to the element. The first fiber portion positioned in the adhesive, while this is still in a liquid state, has plenty of time to straighten out to release any torsional stress present in the fiber before the adhesive is cured.

The fiber portion held between the first 6*a* and second 7 clamping arrangements is tensioned by moving at least one of the clamping arrangements away from the other. The fiber is then cleaved by the blade 4 of the cleaving means 3 (see FIG. 3) and the first fiber portion 5*a* is discarded together with the element 8*a* on which it is received, by removing the element from the support member 9 of the frame structure 2 (see FIG. 4). The resulting fiber part to be used, which includes the second fiber portion 5*b*, is released from the second clamping arrangement 7 to be moved to a further processing step. An unused corresponding receiving element 8*a* is then arranged on the support member 9 to receive a first portion 5*a* of another fiber to be cleaved.

Hence, a method for cleaving an optical fiber 5 and thereby achieving a fiber end surface with excellent characteristics is provided, and may be realized by the device according to the invention which enables clamping of the fiber to be cleaved without causing torsional stress in the fiber. Additionally, the use of adhesive which is cured by light radiation, more specifically UV-radiation, is particularly important for providing a device which operates quickly, due to the short curing time of such an adhesive.

The invention is of course not in any way restricted to the embodiments thereof described above, but many possibilities to modifications thereof will be apparent to a person with ordinary skill in the art without departing from the scope of the invention as defined in the appended claims.

The diameter of a fiber to be cleaved is not restricted to be in a specific range, but the optical fiber cleaving device and method according to the invention could be used for cleaving all fiber diameters presently used, from about 20 µm to about 4 mm, and also fiber diameters not yet used, such as fibers with diameters less than 20 µm or more than 4 mm. However, the device and method are particularly advantageous by cleaving of fibers with diameters less than 1 mm.

The term "clamping" is not to be interpreted literally as is clear from the above description of the first clamping arrangements, but is used to describe that a portion of a fiber is fixedly secured to and held by such an arrangement, for instance by means of adhesive.

The description of a component, such as a receiving element, being arranged at the frame structure is not to be interpreted as that the element must be arranged directly on the frame structure but it could also be arranged on a part of the device secured to the frame structure.

A device according to the invention could also be provided with more than two fiber clamping arrangements, such as also have a third clamping arrangement mounted on the frame structure and configured to fixedly hold a portion of a fiber during cleaving thereof. Also, more than one fiber clamping arrangement of the device could be configured to clamp a fiber by means of adhesive.

The invention claimed is:

1. An optical fiber cleaving device comprising:
a knife positioned and configured to cleave an optical fiber,
first and second clamping arrangements configured to fixedly hold the fiber and positioned at opposite sides of a point of the fiber to be hit by the knife for cleaving the fiber, wherein
the knife and the first and second clamping arrangements are mounted on a frame structure of the device,
the first clamping arrangement comprises a receptacle positioned and configured to receive both a first portion of the fiber and a light-radiation-curing adhesive,
the device further comprises a lamp positioned and configured to apply light on said receptacle when said receptacle is mounted on said frame structure and thereby cure said adhesive to bind the first portion of the fiber to said receptacle to keep the first portion of the fiber at a fixed distance from said point during cleaving of the fiber by the knife,
the receptacle is removably arranged on the frame structure to be fixedly secured to the frame structure during cleaving of the fiber and movable to allow removal of the first portion of the fiber after cleaving,
the receptacle is provided with a plurality of elongated grooves disposed along a surface of the receptacle,
the receptacle is configured to, when arranged on the frame structure, operate between a first mode in which said surface is fixed with respect to the frame structure such that a first one of said plurality of elongated grooves, in which the first portion of the fiber is able to be received and bound by the adhesive, is held in a fixed position during cleaving of the fiber, and
a second mode in which said surface is movable with respect to the frame structure to allow said first one of said plurality of elongated grooves to move away from said fixed position after cleaving of said fiber and an empty second one of said plurality of elongated grooves to move to said fixed position to receive a first portion of another fiber to be cleaved, and
sidewalls of said plurality of elongated grooves each continuously extend without interruption between opposite ends of each of said plurality of elongated grooves.

2. A device according to claim 1, wherein the device further comprises a dispenser for applying the light-radiation-curing adhesive to the receptacle, and the dispenser including a container for storing the adhesive and the dispenser including a nozzle for dispensing the adhesive from the container onto said receptacle.

3. A device according to claim 1, wherein the light-radiation-curing adhesive is a UV-curable adhesive, and said lamp is configured to emit ultraviolet (UV) radiation onto the adhesive.

4. A device according to claim 1, wherein said knife is positioned between and spaced from both said first and second clamping arrangements.

5. A device according to claim 4, wherein said second clamping arrangement has two members provided with clamping surfaces and a hinge coupling said two members together to allow a second portion of the fiber to be secured between said clamping surfaces during cleaving.

6. A device according to claim 1, wherein the receptacle is rotatably arranged on the frame structure such that said surface provided with said plurality of elongated grooves is movable with respect to the frame structure in the second mode of the receptacle by rotation of the receptacle about an axis of rotation.

7. A device according to claim 6, wherein
said surface is a longitudinally-extending outer peripheral surface of the receptacle, the receptacle having a cylindrical shape,
the receptacle is arranged to have said axis of rotation extending parallel to a first axis extending between said first and second clamping arrangements, and
the plurality of elongated grooves disposed at said surface each extend parallel with said axis of rotation, from a first end portion of the receptacle located closest to the knife and along at least a part of the receptacle towards a second opposite end portion of the receptacle, and the plurality of elongated grooves have open ends at said first end portion of the receptacle.

8. A device according to claim 7, wherein said plurality of elongated grooves have second open ends at said second end portion of said receptacle.

9. A device according to claim 8, wherein said plurality of elongated grooves each continuously extend without interruption between said first and second end portions of said receptacle.

10. A device according to claim 6, wherein
said surface is a flat surface extending in a plane parallel to a first axis extending between said first and second clamping arrangements,
the axis of rotation of the receptacle extends through a center portion of said surface in a direction perpendicular to said plane, and
the plurality of elongated grooves disposed at said surface each extend from an outer peripheral edge of the surface towards said center portion of the surface and have open ends at said outer peripheral edge.

* * * * *